(12) United States Patent
Allochis

(10) Patent No.: US 9,615,512 B2
(45) Date of Patent: Apr. 11, 2017

(54) ARTICULATED LATERAL CROP DIVIDER FOR A FLEXIBLE HARVESTING HEADER

(71) Applicant: Jose Luis Allochis, Buenos Aires (AR)

(72) Inventor: Jose Luis Allochis, Buenos Aires (AR)

(*) Notice: Subject to any disclaimer, the term of this patent is extended or adjusted under 35 U.S.C. 154(b) by 0 days.

(21) Appl. No.: 14/735,706

(22) Filed: Jun. 10, 2015

(65) Prior Publication Data

US 2016/0360702 A1    Dec. 15, 2016

(51) Int. Cl.
| | | |
|---|---|---|
| *A01D 63/00* | (2006.01) | |
| *A01D 63/04* | (2006.01) | |
| *A01D 34/04* | (2006.01) | |
| *A01D 34/14* | (2006.01) | |
| *A01D 45/02* | (2006.01) | |

(52) U.S. Cl.
CPC ............ *A01D 63/04* (2013.01); *A01D 34/04* (2013.01); *A01D 34/14* (2013.01); *A01D 45/021* (2013.01); *A01D 63/00* (2013.01)

(58) Field of Classification Search
USPC ........................................................ 56/119
See application file for complete search history.

(56) References Cited

U.S. PATENT DOCUMENTS

| | | | | |
|---|---|---|---|---|
| 1,859,208 A | * | 5/1932 | Kane ...................... | A01D 63/04 56/319 |
| 3,380,233 A | * | 4/1968 | Fergason ............... | A01D 63/04 56/119 |
| 4,038,810 A | * | 8/1977 | Williams ............... | A01D 75/02 56/220 |
| 4,091,602 A | * | 5/1978 | Williams ............... | A01D 34/30 56/11.1 |
| 4,098,061 A | * | 7/1978 | Spiker .................... | A01D 45/22 56/124 |
| 4,330,983 A | * | 5/1982 | Moore ................... | A01D 63/00 56/314 |
| 4,493,181 A | * | 1/1985 | Glendenning ....... | A01D 45/021 56/119 |
| 4,538,404 A | * | 9/1985 | Heimark, Jr. ........ | A01D 45/021 56/119 |
| 5,910,092 A | * | 6/1999 | Bennett ................ | A01D 45/021 56/119 |
| 2009/0277148 A1 | * | 11/2009 | Sethi ..................... | A01D 57/20 56/208 |

* cited by examiner

*Primary Examiner* — Alicia Torres
(74) *Attorney, Agent, or Firm* — Defillo & Associates, Inc; Evelyn A. Defillio

(57) ABSTRACT

A harvesting platform is carried on the front end of an agricultural combine. The harvesting platform includes lateral crop dividers for agricultural harvesting headers with a flexible cutterbar.

8 Claims, 8 Drawing Sheets

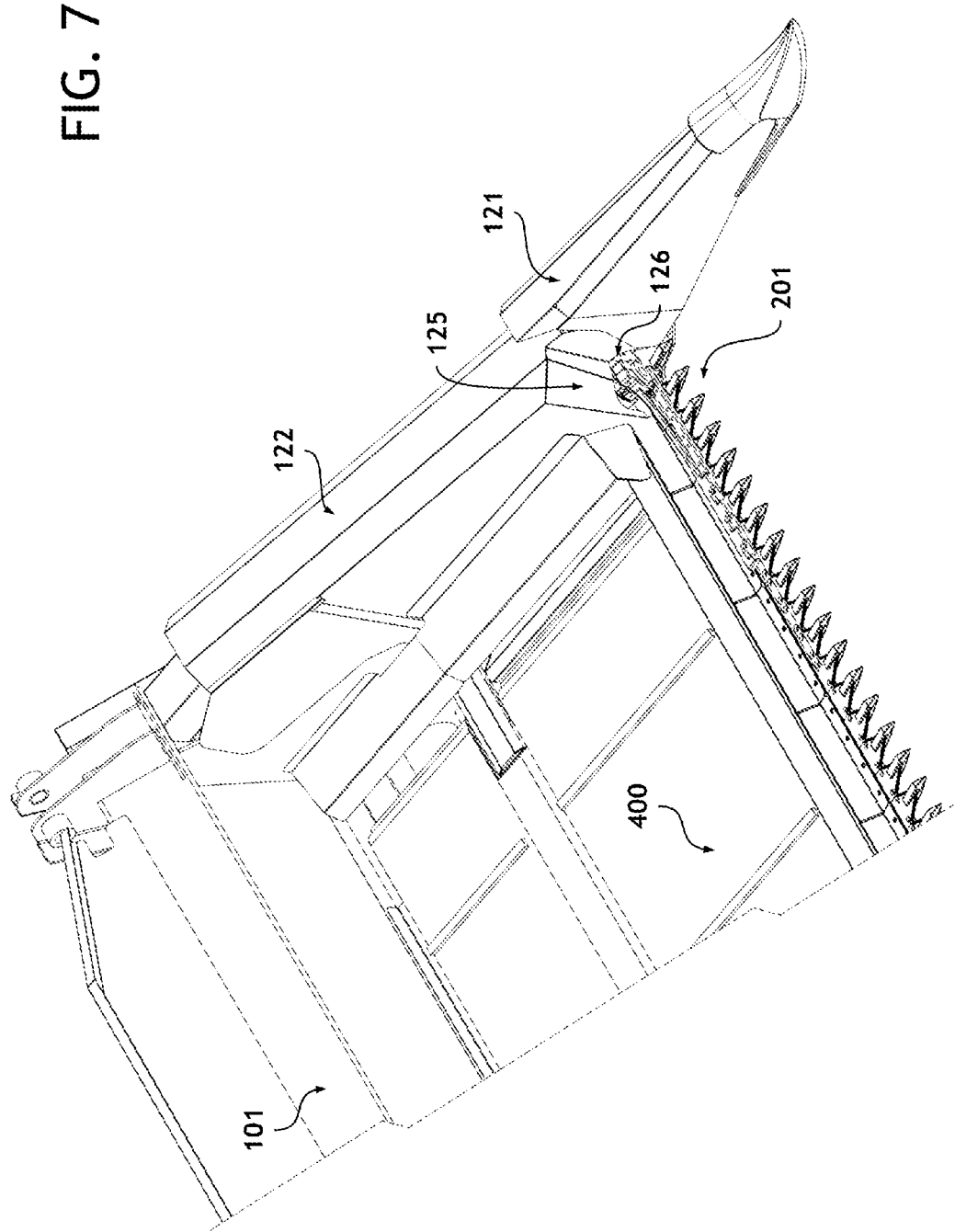

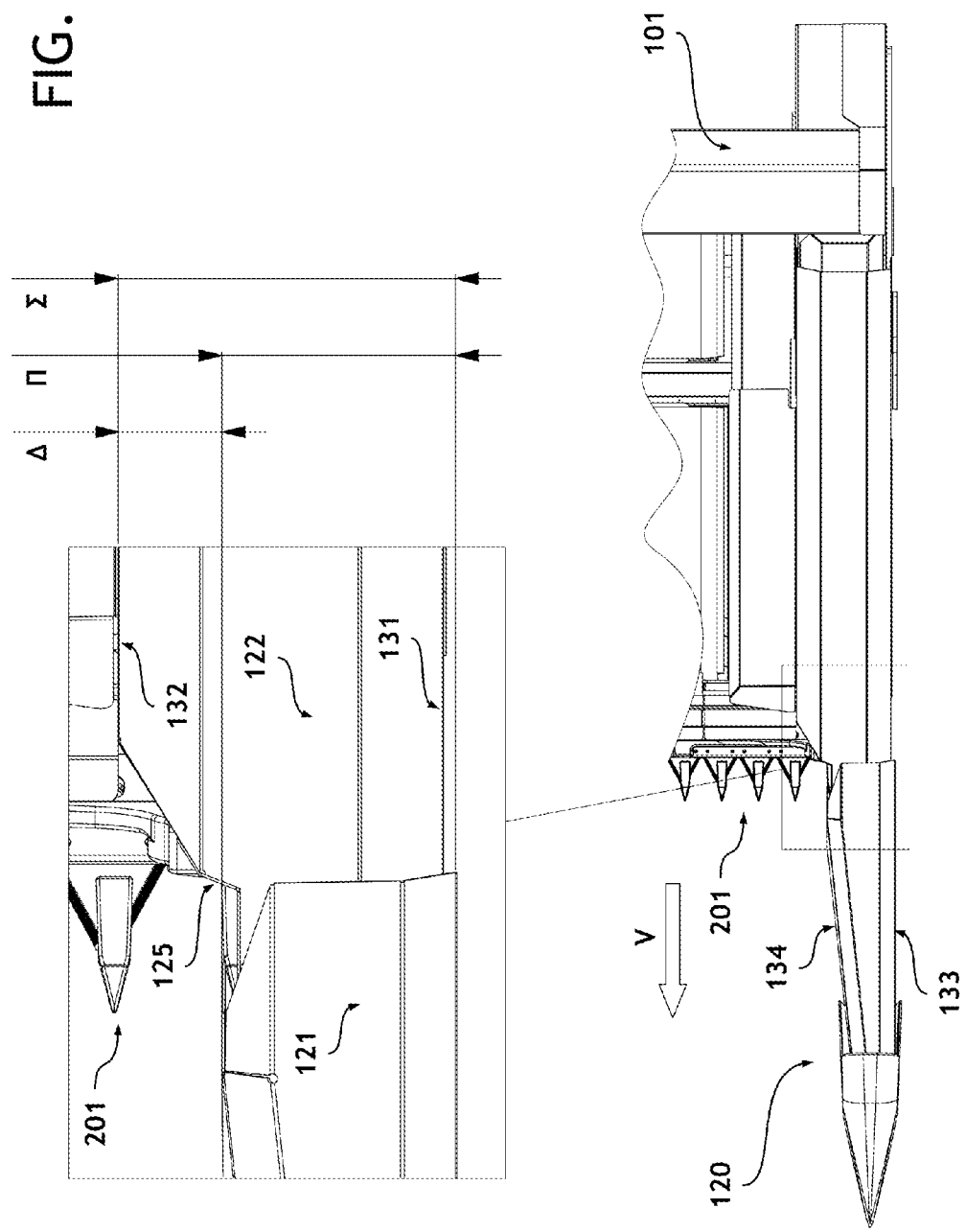

ARTICULATED LATERAL CROP DIVIDER FOR A FLEXIBLE HARVESTING HEADER

FIELD OF THE INVENTION

The present invention relates to harvesting platforms of the type that are carried on the front end of an agricultural combine. More specifically, it relates to lateral crop dividers for agricultural harvesting headers comprising a flexible cutterbar.

BACKGROUND OF THE INVENTION

An agricultural harvesting machine such as a combine tractor generally includes a harvesting front attachment mounted onto a feeder or crop elevator. The front attachment gathers the crop material from the field while the feeder directs it to a threshing separating and cleaning mechanism located in the combine to produce grains. The process further completes when those grains are sent from the combine to the next step of the production chain selected for this type grain.

For low growing, thin stemmed crops such as soybeans, barley, wheat, bean, etc., the header driven by the combine has a reciprocating knife at the leading edge called cutterbar. The crop is cut using the cutterbar and falls forward onto laterally extending conveyor that carry the crop to a central section of the header. This laterally extending conveyor was generally a screw conveyor, usually called auger. Nowadays the lateral conveyor is preferably a belt conveyor, which is known as a draper conveyor.

The header is mounted to the combine tractor at open end. The crop material travels laterally by means of the draper conveyor and passes then through this open end to the feeder of the combine.

For some grains, such as wheat, the cutterbar of the header can be spaced from the ground during the cutting operation. For other grains, the cutterbar assembly is set to work slipping over the ground and thus forced to go up and down and curl to assimilate its contour, in order to collect most of the grain. Flexible headers are used to follow the natural contours of the field while cutting the grain.

A common item of the header is a rotating reel with cross members or rungs which carry tines. The reel lifts and moves the plants up to be harvested toward the cutterbar. Another usual items are row dividers units, mounted on the header at the side ends of the reel. The divider units guide, untangle and separate plants located along the periphery of the intended path of travel of the header into the path of travel of the reel. Such crops located along the periphery might otherwise not be harvested, or it might be necessary to slightly overlap the previous path of harvest on the next pass.

Conventional grain harvesters are problematic and suffer from various undesirable limitations. For instance, flexible headers that include a flexible cutterbar are ineffective at receiving all of the severed crop material when following the ground contour at a high speed. Also, prior art headers usually generate high losses of grains at the side ends due to poor designs of their end dividers.

Because the side end crop dividers swing up and down independently of the cutterbar, crop separation is problematical. Prior art headers usually have a lagging of the contour following movements of the end dividers compared to the shifting of the cutterbar. Thus, in at severe contoured terrains they stomp down the crop at the sides at the end dividers location, shelling the plants or leaving them laying severely down negating its future recollection.

Some more advanced end dividers where constructed to swing accordingly to the cutterbar, but designed in a single piece generally excessively wide. Thus, the hole divider behaves as a long stick that when swings aggressively, it digs easily into the ground (when shifting rapidly down) and result broken, or pulls up tangled plants (when shifting rapidly down) and result into losses.

Also, with an average distance between plants of 10 cm on soybeans, and considering that soybean is usually cut with a slant on the platform travel direction respect to the planting rows, a 20 cm width crop divider will tend to stomp at least one plant per row on each platform pass (and turn them impossible to exploit). Prior art row dividers suffer this loss for its excessive width.

It is an object of this invention to provide a header with lateral dividers that harmonically accompany the flexing and twisting of the conveyor belts at the side ends and that generates minimal losses of grains.

DESCRIPTION OF THE DRAWINGS

FIG. 7 is a top front inner perspective view of the platform shown in FIG. 1, showing a transition region of the end divider at the cutterbar area.

FIG. 10 is a magnified view of a top fragmentary view of the platform shown in FIG. 1, showing the width differences of the sections of the left articulated crop divider.

Figure 1:
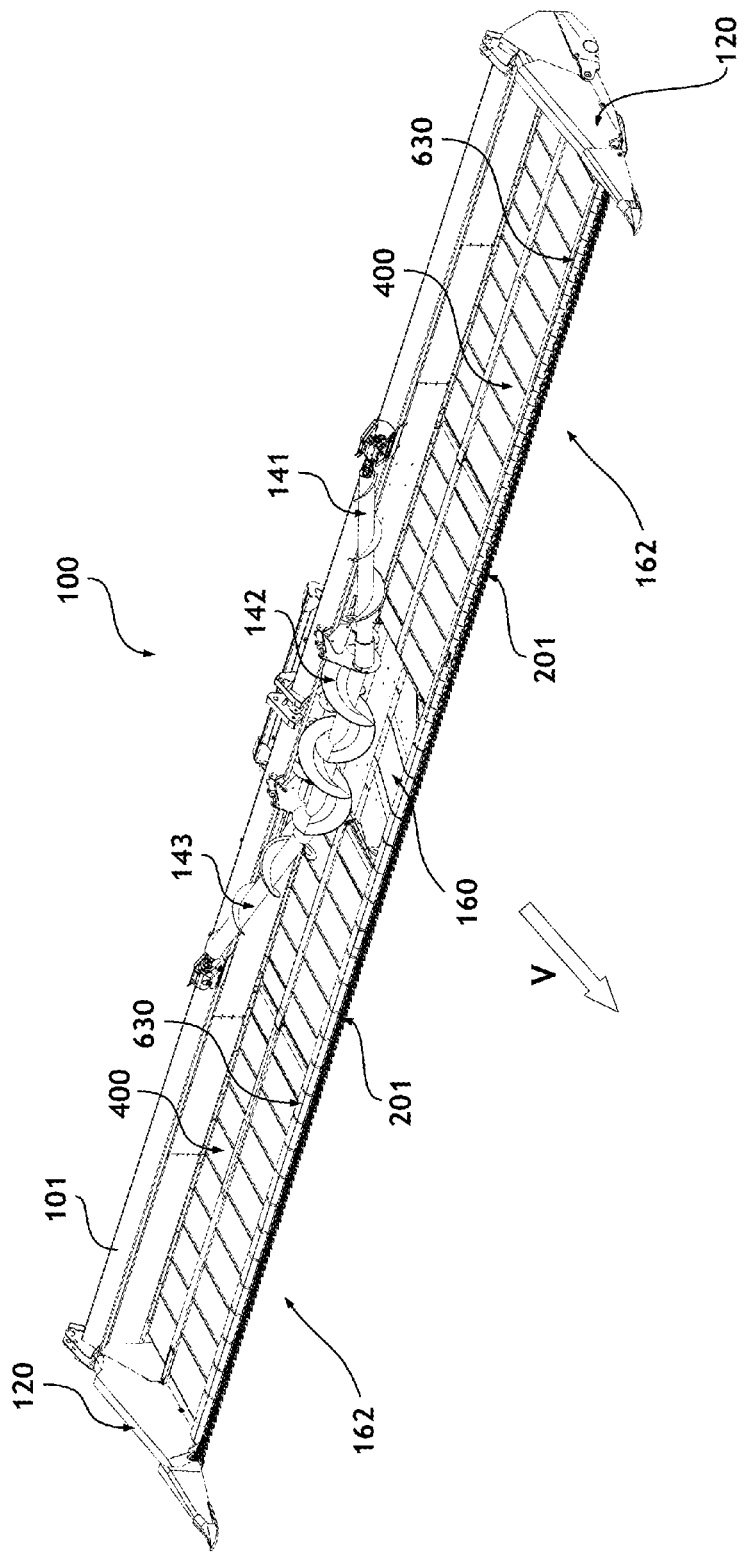
FIG. 1 is a top front perspective view illustrating a platform in accordance with the present invention.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE EMBODIMENT

Figure 2:
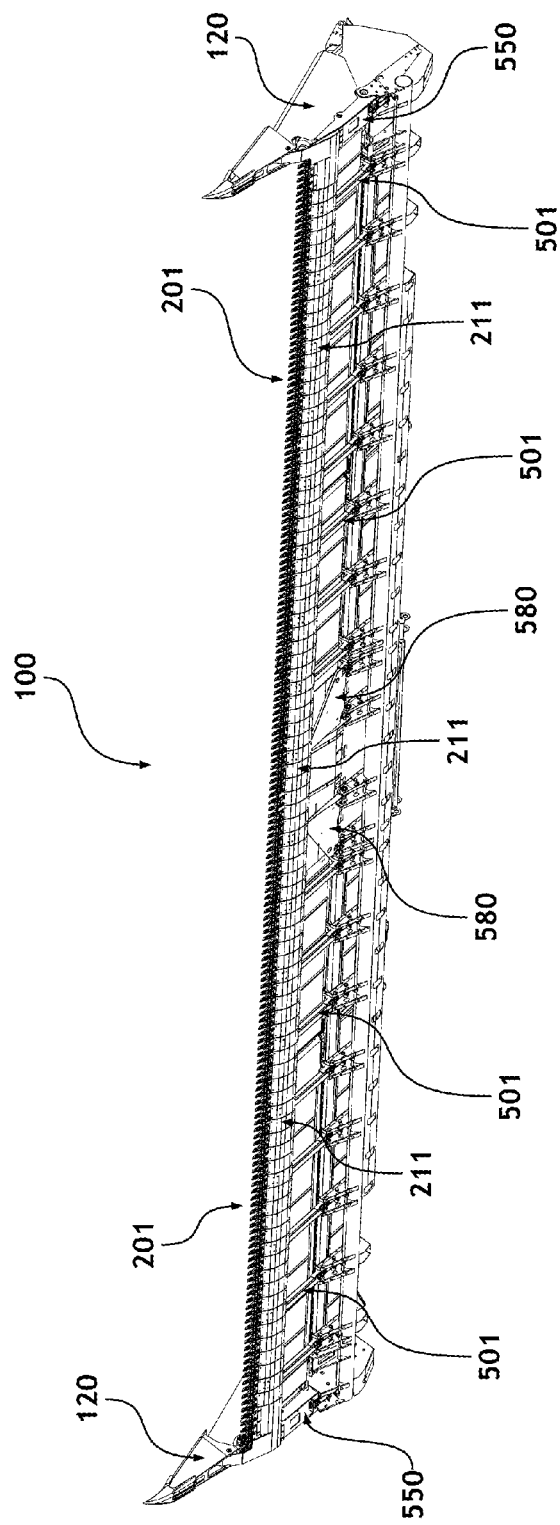
FIG. 2 is a bottom front perspective view of the platform shown in FIG. 1.
Figure 3:
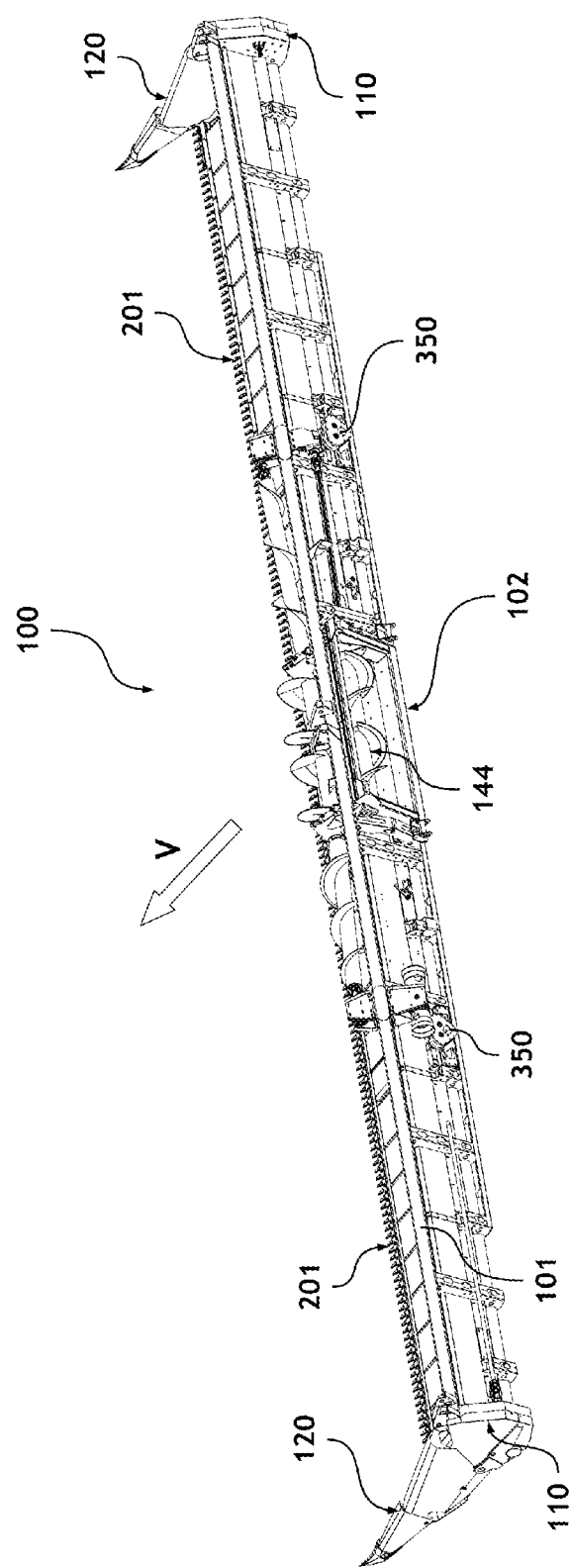
FIG. 3 is a top rear perspective view of the platform shown in FIG. 1.

Referring to FIGS. 1-3, the harvest header selected for illustration comprises a flexible platform 100 used in agricultural machines, preferably combine tractors. The platform 100 is configured to cut and harvest the crop while is advanced in a direction V generally forward so that the material is conveyed to an open end 102 and subsequently processed by other elements (not shown) of the combine tractor (not shown) to finally produce grains.

The platform 100 illustrated generally includes a main frame 101 comprising a central section 160 which projects forwardly from the open end 102, and at least two side sections 162 projecting laterally on either side of said central section 160. All the sections 160, 162 are bounded forwardly by the cutterbar assembly 201 and at the rearward by the main frame 101. Inside side sections 162 there is a set of belt support arms 501 responsible for a holding the cutterbar assembly 201 and responsible for sustain partially the set of belts of a draper conveyor 400. Draper conveyors 400 are responsible for transporting the cut crop from the side sections 162 to the center section 160. The outer lateral limits of the side sections 162 are each defined by a side arm 550, which is configured as the outermost point of support of the cutterbar assembly 201, and is responsible for carrying the transmission mechanism for driving said cutterbar 201. The portion of the cutterbar 201 which corresponds to the central section 160 is supported by at least one central arm 580, thus conferring to the platform 100 the property that its cutterbar assembly 201 is completely flexible, from end to end, from the outer side end of a side section 162 to the outer side end of the other side section 162. The platform 100 also contains a central auger assembly 140 comprising a right oblique auger 143, a left oblique auger 141, a front central auger 142 and a rear central auger 144; furthermore, contains a reel (not shown) extending laterally almost the full width of the platform 100 that operates to push inward standing crop platform 100. Both of the cutterbar assembly 201 and the draper conveyor 400 are preferably flexible so that the platform can work virtually 100 attached to the floor and adapt to the changing curved profile of the terrain when operated through the working direction V.

The platform 100 cited in the present invention is configured such that when advanced in the direction V, it erects and directs the crop with the reel (not shown) towards the draper conveyors 400 while cutting it via the cutterbar assembly 201. The cut crop falls onto the draper conveyor 400 and is carried to the central section 160 of the platform 100, where the set of augers 140 finally pushes it across the open end 102 to be subsequently treated by a threshing machine (not shown).

Articulated Crop Divider

Figure 4:
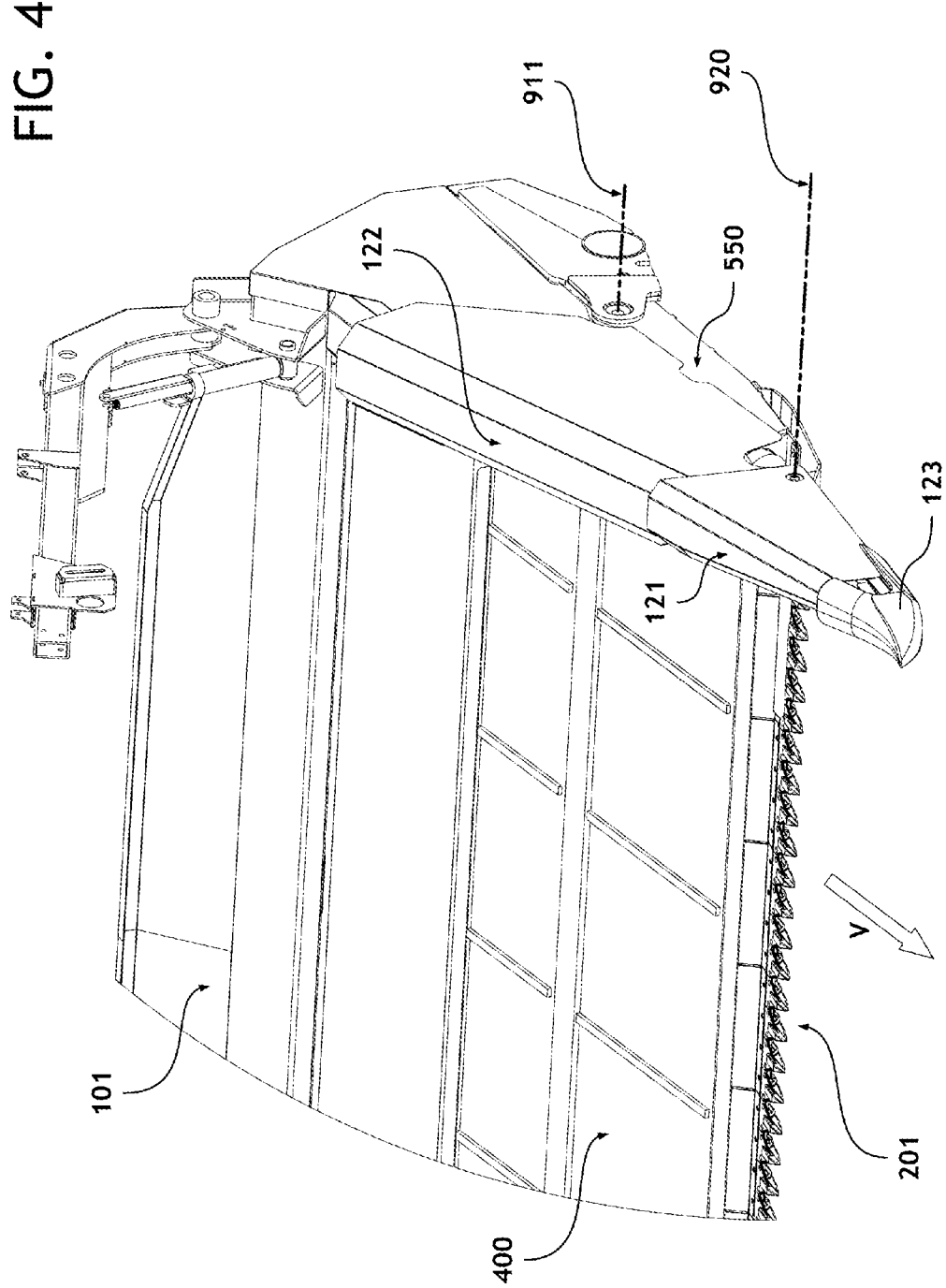
FIG. 4 is a top front perspective fragmentary view of the platform shown in FIG. 1, showing the articulation of the left crop divider.
Figure 6:
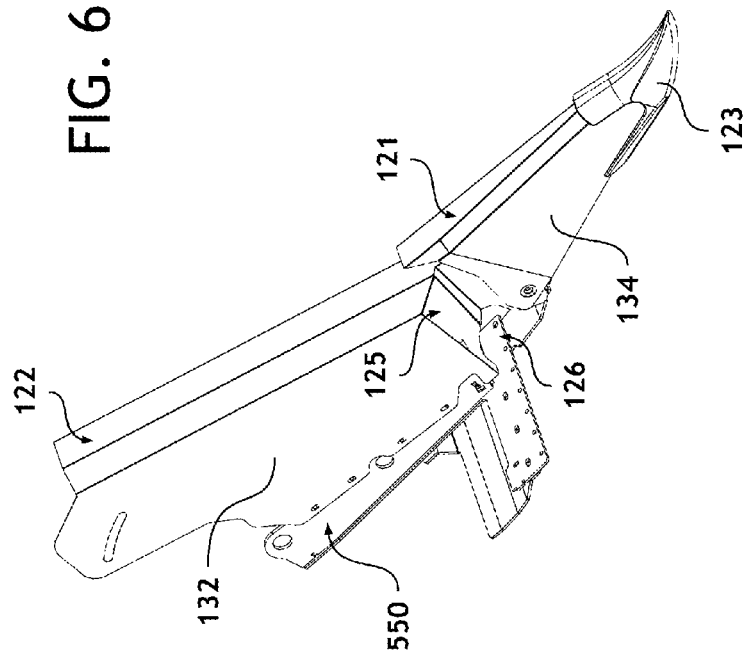
FIG. 6 is a top front inner perspective view of the lateral crop divider shown in the platform of FIG. 4, showing the inner walls that defines the cutting scope of the cutterbar.
Figure 5:
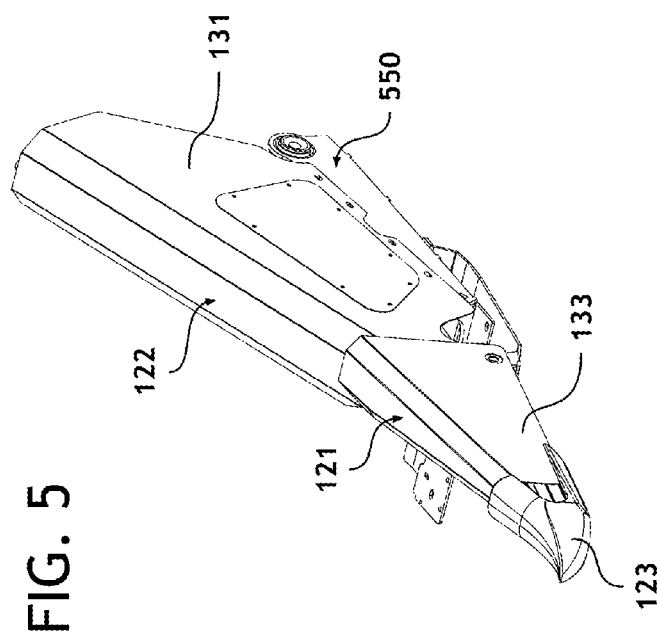
FIG. 5 is a top front outer perspective view of the lateral crop divider shown in the platform of FIG. 4, showing the outer wall forming the left lateral end the platform.

The platform 100 further includes lateral crop dividers 120 that serves to direct crop inwards and deflect severed crop material onto the draper conveyors 400. Referring to FIGS. 4 to 6, it is shown a preferred configuration for the lateral crop dividers 120. The lateral crop dividers 120 are mounted on the outermost support arms 550. Said outermost support arms 550 are disposed, at least partially, outside the lateral scope of the reel.

It is important to notice that all the support arms 501, 550, 580 pivot around the same laterally extending axis 911. Lateral crop dividers 120 are disposed such that when the outermost arms 550 pivots up and down, the crop dividers 120 also pivots accordingly in the same direction.

Each lateral crop divider 120 is composed of a first section 122 that projects forward from the back at the main frame 101 to the region of the cutterbar 201. The lateral crop dividers 120 also comprise a second section 121 projecting forward from the front of the corresponding first section 122. In the preferred embodiment, second sections 121 are pivotally coupled to the first sections 122 so that they can rotate about an axis 920 (FIG. 4). This axis 920 generally projects transversely through the crop divider 120 substantially parallel to the laterally projecting cutterbar 201. Then, when the cutterbar 201 is requested to shift up and down, the crop divider 120 is able to articulate and follow forwardly the contour of the terrain and therefore work always virtually glued the ground.

Turning to FIGS. 5 to 7, the sections 121,122 of the crop divider 120 are laterally defined by upwardly projecting side walls. First section 122 comprises an outer wall structure 131 that limits the lateral extent outwardly and an inner wall structure 132 that limits inwardly. Second section 121 also comprise inner 134 and outer 133 wall structures that defines its width. In a preferred embodiment, a sharp, pointed snout 123 is fastened to the forward portion of the second section to form like a hole opening tip device that enhance the separation capabilities of the hole crop divider 120. Also, the inner side wall 134 of the second section 121 is constructed with a slope such that the second section 121 is thinner at the front than in the rear.

Figure 8:
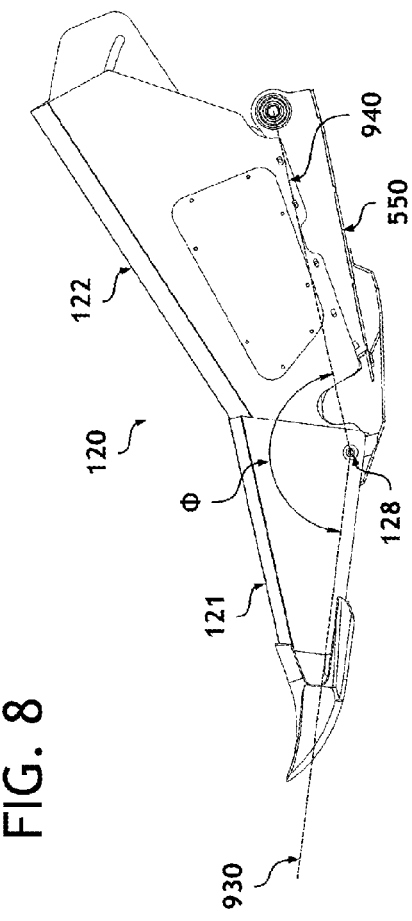
FIG. 8 is a lateral fragmentary view of the platform shown in FIG. 1, with the front section of the left articulated crop divider shifted upwards.
Figure 9:
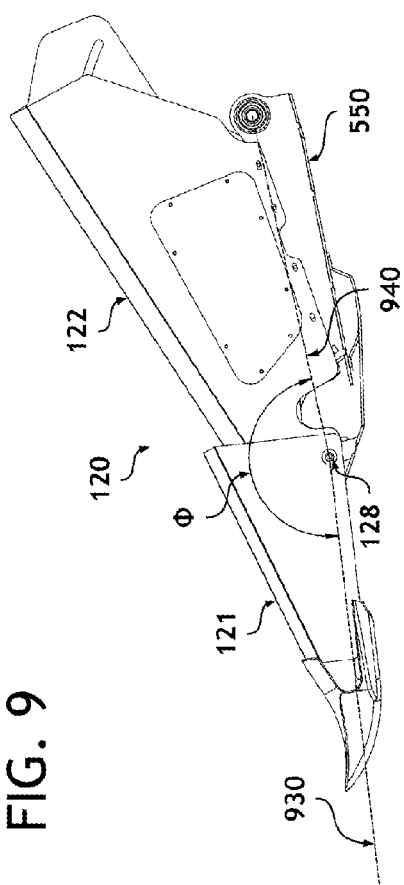
FIG. 9 is a lateral fragmentary view of the platform shown in FIG. 1, with the front section of the left articulated crop divider shifted downwards.

FIGS. 8 and 9 display the dual pivotal movement of the crop divider 120. The axial axis 940 of the outermost arm 550 can turn at the rear around axis 911 (FIG. 4), while at the same time the axial axis 930 of the second section 121 can turn around the pivot axis 920, independently. The joint between sections 122, 121 is the articulation 128. Hence, whenever the outermost arm 550 is pivoted the first section 122 is pivoted, and the angle φ between the sections 121, 122 changes. It is important to notice that the uppermost arm 550 is also operable to work without pivoting, but this does not impede the second sections 121 to pivot by their own.

Referring to FIGS. 5 to 10, a preferred configuration of the crop divider 120 is granted when the width of the second section 121 is substantially thinner (at least partially) that the width of the first section 122. The transition zone, that is the region where the second section 121 joints the first section 121, is preferably placed forwardly substantially over the cutting line of the cutterbar 201.

The inner wall 132 of the first section 122 inwardly presents a transition face 125 that projects forwards and outwards through a surface that slims down the width at the front to the width of the rear end of the second section 121, to permit then a single width coupling with the latter. Furthermore, transition face 125 also presents an opening 126 at the bottom. Such opening 126 allows the cutterbar to severe the crop and plants that flow straight to the transition zone, while at the same time the sloped shape of the transition surface 125 is able to deflect the flow from an upper region.

FIG. 10 shows how the width Σ at the front of the first section 122 is generally wider that the width Π at the rear of the second section 121. The difference of said width is the width Δ of the transition surface 125.

Another feature of the present invention is that the outer lateral wall members (131) of said first sections (122) are substantially on the same plane of the outer lateral wall members (133) of said second sections (121). Thence, the total width of the platform 100 can be defined as the distance between the any of the two opposite outer lateral wall members (131, 133).

The preferred forms of the invention described above are to be used as illustration only, and should not be utilized in a limiting sense when interpreting the scope of the present invention. Some alterations to the exemplary embodiments described above could be readily made by those skilled in the art without departing from the spirit of the present invention.

The inventor hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. An agricultural platform (100) used to harvest crops, said platform configured to be supported at an open end (102) that is set up to receive severed crop materials, said platform comprising:
   a main frame (101) comprising said open end (102), said main frame comprising a central section (160) located adjacent to said open end, and comprising right and left lateral sections (162) located respectively on each side of said central section, the lateral sections extending transversely with respect to the normal direction of travel (V) of the platform;
   each one of said right and left lateral sections (162) presenting laterally endmost margins;
   a plurality of arms (501) pivotally coupled to the main frame (101) to pivot up and down at their forward ends with respect to said main frame (101), wherein each of said arms extend in a forward direction,
   a cutterbar assembly (201) to extend lengthwise through said lateral and central sections; said cutterbar assembly being operable to flex along the length thereof in response to changes in terrain as the platform is advanced;
   the front ends of said arms (501) being attached to and cooperatively supporting the cutterbar assembly (201);
   laterally outer arms of said support arms (501) configured as outermost arms (550), said outermost arms (550) being positioned at said endmost margins of the right and left lateral sections (162);
   a lateral crop divider (120), mounted adjacent to each one of the outermost arms (550) each one of the crop dividers (120) comprising a first section (122) and a second section (121);
   said lateral crop divider (120) extending forwardly from the main frame (101) to surpass the cutterbar assembly (201);
   the first section (122) of each one of the crop dividers presenting a front and a rear end, wherein the front end is linked to the cutterbar assembly (201) to move up and down when said cutterbar (201) flexes; and
   the second section (121) of each crop divider presenting a front end and a rear end, wherein said rear end is pivotally coupled to the front end of the corresponding first section (122) to form an articulation (128).

2. The agricultural platform according to claim 1, wherein:
   the first section (122) of each of said crop dividers (120) comprising inner (132) and outer (131) lateral wall members projecting generally upwards, wherein the distance between said wall members defines the width (Σ) of said first section;
   the second section (121) of each of said crop dividers (120) comprising inner (134) and outer (133) lateral wall members projecting generally upwards, wherein the distance between said wall members defines the width (Π) of said second section; and
   said first section (122) being characterized because its width (Σ) is essentially wider than the width (Π) of said second section (121).

3. The agricultural platform according to claim 2, wherein the outer (131) lateral wall members of said first sections (122) being substantially on the same plane of the outer (133) lateral wall members of said second sections (121).

4. The agricultural platform according to claim 2, wherein:
   the first sections (122) presenting on the inner (132) wall members at said front ends a transition surface (125); and
   said transition surface (125) projecting forwardly and outwardly to match the width (Π) of said second section (121).

5. The agricultural platform according to claim 4, wherein:
   the transition surface (125) presenting a recess (126) at the bottom; and
   said recess (126) uncovering a laterally outermost section of the cutterbar (201), wherein the width (Δ) of the recess expands the total effective cutting width of said cutterbar (201).

6. The agricultural platform according to claim 2, wherein:
   the inner wall members (134) of the second sections (121) projecting forwardly and outwardly from said rear end to said front end; and
   the front ends of said second section (121) converging forwardly into a tapered snout (123).

7. The agricultural platform according to claim 1, wherein:
   the first sections (122) of the lateral crop divider (120) being mounted on a respective outermost arm (550) to pivot therewith as the cutterbar assembly (201) flexes; and
   the second sections (121) of the lateral crop dividers (120) shift up and down with respect to the corresponding outermost arm (550) pivoting motion and also swings independently because of the articulation (128).

8. A method for operating the agricultural platform according to claim 1, said method comprising the steps of:
   operating the platform (100) with the cutterbar (201) at an elevation substantially separated from the ground to cut plants and crop at a desired height, wherein said cutterbar (201) does not contact to the ground and thus operate without flexing; and
   operating the front ends of the second sections (121) to work generally sliding over the ground and small objects on top of the ground; said second sections (121) lightly skid across the ground over changing terrain and accommodate by swinging up and down by the articulation (128).

* * * * *